(12) United States Patent
Inampudi et al.

(10) Patent No.: US 9,438,291 B2
(45) Date of Patent: Sep. 6, 2016

(54) SYSTEM AND METHODS FOR IMPROVING RECOVERY FROM AN OUT-OF-SERVICE STATE BY SIMS OF A MULTI-SIM DEVICE BASED ON USER ACTIVITY

(71) Applicant: QUALCOMM Incorporated, San Diego, CA (US)

(72) Inventors: Venkata Srihari Inampudi, Hyderabad (IN); Ankammarao Ravuvari, Hyderabad (IN); Manikanta Vara Prasad Pitchuka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 14/546,047

(22) Filed: Nov. 18, 2014

(65) Prior Publication Data

US 2016/0142087 A1    May 19, 2016

(51) Int. Cl.
*H04B 1/38* (2015.01)
*H04B 1/3816* (2015.01)
*H04W 4/22* (2009.01)
(Continued)

(52) U.S. Cl.
CPC ............ *H04B 1/3816* (2013.01); *H04W 4/22* (2013.01); *H04W 48/16* (2013.01); *H04W 76/028* (2013.01)

(58) Field of Classification Search
CPC ... H04W 48/18; H04W 48/16; H04W 88/06; H04W 60/005; H04W 8/183; H04W 52/0229; H04W 52/0241; H04W 52/0245; H04W 72/02; H04W 76/025; H04W 8/18; H04B 1/3816

USPC .................... 455/435.1–435.3, 558
See application file for complete search history.

(56) References Cited

U.S. PATENT DOCUMENTS

| | | | | |
|---|---|---|---|---|
| 2009/0298437 A1* | 12/2009 | Hoefel | ................ | H04W 48/16 455/67.11 |
| 2009/0305737 A1* | 12/2009 | Bae | .................. | H04W 4/20 455/552.1 |
| 2010/0002611 A1* | 1/2010 | Umatt | ............. | H04W 52/0241 370/311 |

(Continued)

FOREIGN PATENT DOCUMENTS

| | | |
|---|---|---|
| WO | 2012089634 A1 | 7/2012 |
| WO | 2013189061 A1 | 12/2013 |

(Continued)

OTHER PUBLICATIONS

International Search Report and Written Opinion—PCT/US2015/053733—ISA/EPO—Jan. 18, 2016.

*Primary Examiner* — Allahyar Kasraian
(74) *Attorney, Agent, or Firm* — The Marbury Law Group, PLLC

(57) ABSTRACT

Methods and devices for controlling recovery from an out-of-service state on a multi-SIM wireless device that has at least two subscription identification modules (SIMs), and that determines whether a voice call or an active data communication session was dropped upon losing service, and prioritizes service recovery on the modem stack associated with the dropped voice call or active communication session. If neither a voice or data call was dropped upon losing service on both SIMs, the multi-SIM wireless device may calculate a priority value for each of the first and second SIMs, calculate an RF resource allocation percentage for each of the first and second SIMs, and grant use of the RF resource to the modem stacks associated with the first and second SIMs based on the calculated RF resource allocation percentages.

30 Claims, 10 Drawing Sheets

(51) Int. Cl.
*H04W 48/16* (2009.01)
*H04W 76/02* (2009.01)

(56) References Cited

U.S. PATENT DOCUMENTS

| | | |
|---|---|---|
| 2011/0117944 A1 | 5/2011 | Cao et al. |
| 2011/0207491 A1* | 8/2011 | Swaminathan ....... H04W 48/18 455/509 |
| 2011/0217969 A1 | 9/2011 | Spartz et al. |
| 2012/0264425 A1* | 10/2012 | Krishnamoorthy ... H04W 48/16 455/434 |
| 2013/0005291 A1* | 1/2013 | Geary .................. G06F 1/3209 455/404.1 |
| 2013/0150126 A1* | 6/2013 | Pattaswamy .......... H04W 8/183 455/558 |
| 2013/0189985 A1 | 7/2013 | Mutya et al. |
| 2013/0227581 A1 | 8/2013 | Nader |
| 2014/0004842 A1 | 1/2014 | Lindoff et al. |
| 2014/0220992 A1* | 8/2014 | Henneberg Rysgaard ........... H04W 72/048 455/452.1 |
| 2015/0079985 A1* | 3/2015 | Vuchula ............... H04W 48/16 455/435.1 |
| 2015/0092708 A1* | 4/2015 | Su ....................... H04W 76/026 370/329 |
| 2015/0237497 A1* | 8/2015 | Chen .................... H04W 8/183 455/558 |
| 2015/0281926 A1* | 10/2015 | Liu ........................ H04M 3/42 455/558 |
| 2015/0312717 A1* | 10/2015 | Shih ..................... H04W 8/183 455/456.1 |
| 2015/0351013 A1* | 12/2015 | Zhang .................. H04W 48/18 370/328 |
| 2016/0073417 A1* | 3/2016 | Sebeni ................. H04W 48/16 370/329 |

FOREIGN PATENT DOCUMENTS

| | | |
|---|---|---|
| WO | 2015038236 A1 | 3/2015 |
| WO | 2015038237 A1 | 3/2015 |
| WO | 2015156948 A1 | 10/2015 |

\* cited by examiner

|  | Start of Activity Interval | | | |
|---|---|---|---|---|
|  | T–A | T–2A | T–3A | ... T–NA |
| Weight of MT calls (WMT) | 8 | 6 | 7 | ... WMT$_{T-NA}$ |
| Weight of MO calls (WMO) | 6 | 4 | 5 | ... WMO$_{T-NA}$ |
| Weight of data calls (WD) | 4 | 2 | 3 | ... WD$_{T-NA}$ |

FIG. 5A

| SIM_1 | Start of Activity Interval | | | |
|---|---|---|---|---|
|  | T–A | T–2A | T–3A | ... T–NA |
| Count of MT calls (CMT) | 5 | 3 | 6 | ... CMT$_{T-NA}$ |
| Count of MO calls (CMO) | 3 | 2 | 4 | ... CMO$_{T-NA}$ |
| Count of data calls (CD) | 1 | 1 | 1 | ... CD$_{T-NA}$ |

| SIM_2 | Start of Activity Interval | | | |
|---|---|---|---|---|
|  | T–A | T–2A | T–3A | ... T–NA |
| Count of MT calls (CMT) | 4 | 2 | 3 | ... CMT$_{T-NA}$ |
| Count of MO calls (CMO) | 0 | 4 | 2 | ... CMO$_{T-NA}$ |
| Count of data calls (CD) | 0 | 2 | 0 | ... CD$_{T-NA}$ |

FIG. 5B

SYSTEM AND METHODS FOR IMPROVING RECOVERY FROM AN OUT-OF-SERVICE STATE BY SIMS OF A MULTI-SIM DEVICE BASED ON USER ACTIVITY

BACKGROUND

Multi-SIM wireless devices have become increasing popular because of the versatility that they provide, particularly in countries where there are many service providers. For example, dual-SIM wireless devices may allow a user to implement two different plans or service providers, with separate numbers and bills, on the same device (e.g., business account and personal account). Also, during travel, users can obtain local subscriber identification module (SIM) cards and pay local call rates in the destination country. By using multiple SIMs, a user may take advantage of different pricing plans and save on mobile data usage.

In various types of multi-SIM wireless communication devices, each modem stack associated with a subscription may store information provisioned by its respective network operator in a SIM, which may allow the SIM to support use of various different communication services. For example, various wireless networks may be configured to handle different types of data, use different communication modes, implement different radio access technologies, etc.

One type of multi-SIM wireless device, referred to as a dual-SIM dual active (DSDA) device, allows simultaneous active connections with the networks corresponding to two SIMs using separate transmit/receive chains associated with each SIM. However, such separate components may provide convenience to a user, but may require high power consumption during operation. Another type of multi-SIM wireless device, referred to as a dual-SIM dual standby (DSDS) device, includes a single radio frequency (RF) resource and typically provides for a "standby" mode (i.e., idle mode) in which services associated with either SIM may originate or terminate a communication (e.g., a voice call or data call), and in which services associated with both SIMs may receive pages using the shared RF resource. By sharing an RF resource between the services enabled by both SIMs, a DSDS device may allow for a longer battery life than that of a DSDA device, as well as other benefits (e.g., lower cost of the device, avoiding receiver desense from co-located radios, etc.).

In a conventional DSDS device, when an out-of-service (OOS) state is detected for at least one SIM, the modem stack associated with each out-of-service SIM typically starts a service recovery process, which may involve using the RF resource for system acquisition and cell selection procedures to camp on a serving cell. Such service recovery process recovery is generally employed independently by each modem stack associated with an out-of-service SIM, which creates conflicting RF resource requests in a DSDS device in which two or more SIMs are in an OOS state. The order in which each modem stack associated with an out-of-service SIM is granted use of the RF resource may be pre-determined based on fixed settings on the wireless device, or may be "first-come first-serve," without any consideration of other SIM requirements. Further, the amount of time allocated to each SIM to perform OOS recovery processes may be static, restricted only by a time-out after unsuccessful attempts to perform system acquisition and/or to camp on any cell.

If at least one SIM is in the OOS state while at least one other SIM remains in service, in a conventional DSDS device the determination of whether, and how long to attempt service recovery on the out-of-service SIM may be based solely on current conditions associated with the in-service SIM (e.g., currently network state, ongoing activities, etc.). As a result, the DSDS wireless device may experience a long overall delay for all SIMs to successfully recover service and camp on a serving cell.

SUMMARY

Systems, methods, and devices of the various embodiments enable a multi-SIM wireless communication device having at least a first and second SIM respectively associated with modem stacks to control out-of-service recovery by detecting that at least one of the modem stacks associated with the first and second SIMs is in an out-of-service state, and determining whether both of the modem stacks associated with the first and second SIMs are in the out-of-service state. Embodiment methods may also include, in response to determining that the modem stacks associated with both the first and second SIMs are in the out-of-service state, determining whether a voice call or an active data communication session was dropped upon losing service by the modem stack associated with either of the first and second SIMs, and prioritizing service recovery on the modem stack associated with the dropped voice call or active data communication session.

Embodiment methods may also include applying a service recovery priority equation in response to determining that no voice call or an active data communication session was dropped upon losing service by the modem stack associated with either of the first and second SIMs. In some embodiment systems, methods and devices, applying the service recovery priority equation may include accessing information about past activities on the modem stacks associated with the first and second SIMs, and calculating a priority value for each of the first and second SIMs. In some embodiment systems, methods and devices, the first and second SIMs may be associated with a single radio frequency (RF) resource, and applying the service recovery priority equation may also include calculating, based on the calculated priority values, an RF resource allocation percentage for each of the first and second SIMs, and granting use of the RF resource to the modem stacks associated with the first and second SIMs. In some embodiment systems, methods and devices, relative amounts of use granted to each modem stack may correspond to the calculated RF resource allocation percentages.

In some embodiment systems, methods and devices, accessing information about past activities on the modem stacks associated with the first and second SIMs includes accessing an activity history database stored on the wireless communication device, which may include a weight assigned to each of a plurality of activities enabled by a connection to a network supported by at least one of the first and the second SIMs, and for each SIM, a count totaling a number of occurrences of each activity during at least one monitored time period.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIGS. 5A and 5B are data structure diagrams illustrating example data tables in an activity history database that may store information used to calculate priority values for an out-of-service SIMs according to various embodiments.

DETAILED DESCRIPTION

Figure 1:
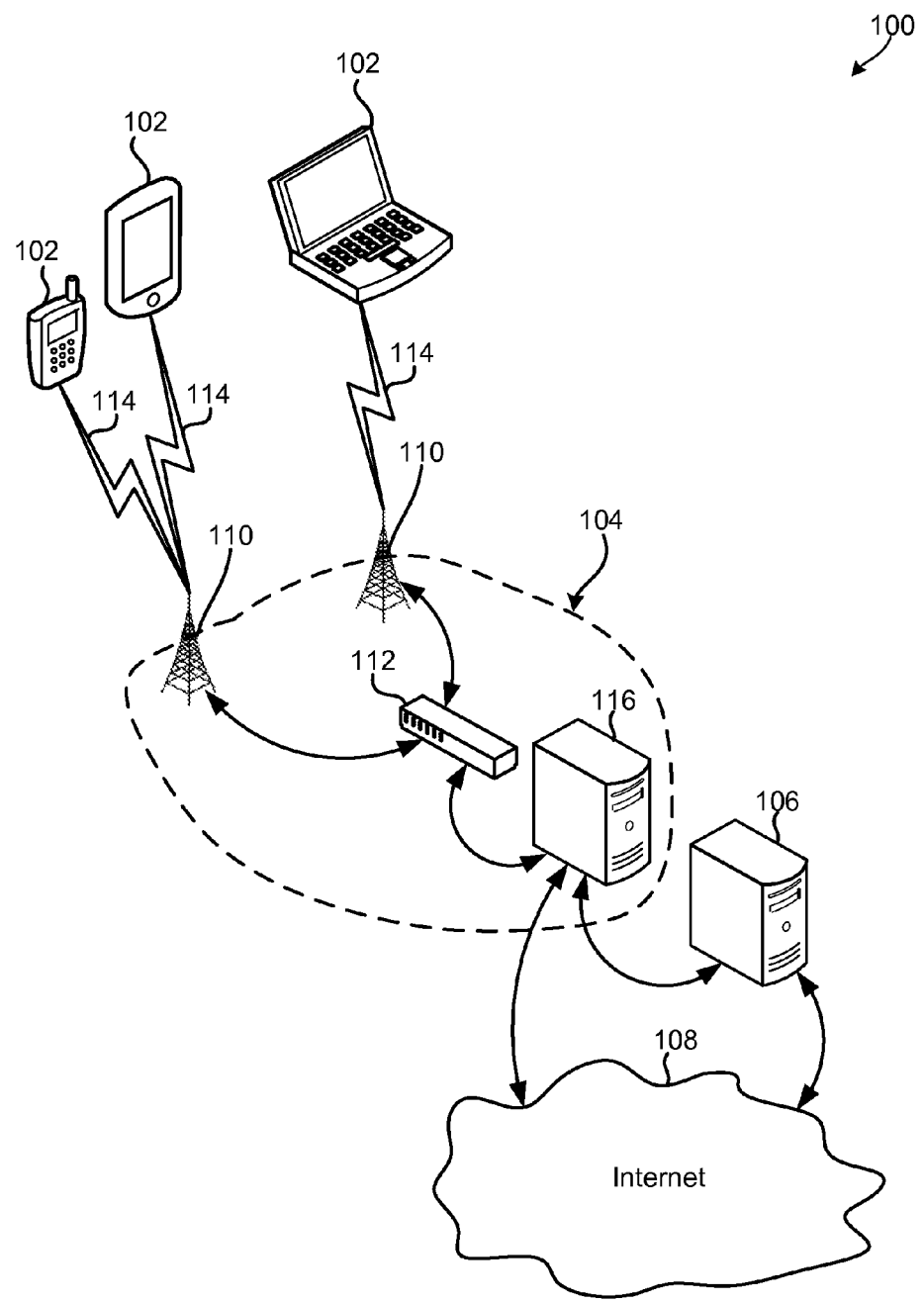
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

Various embodiments provide improved processes for recovering from an out-of-service (OOS) state on one or more SIMs of a multi-SIM, single radio wireless communication device. In various embodiments, the order and relative amount of access to the radio frequency (RF) resource granted to each out-of-service SIM may be driven by user activity on the wireless device. In this manner, the relative importance of recovering service on different SIMs may reflect the user experience-centric functionality of many current wireless devices. Therefore, service recovery processes for out-of-service SIMs may have greater accuracy for each particular user. In some embodiments, current user activities and/or patterns of user activity on the device over a past interval may be factored into a calculation of whether and how much RF resource access should be granted to each out-of-service SIM.

The terms "wireless device," and "wireless communications device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

The terms "SIM", "SIM card," and "subscriber identification module" are used interchangeably herein to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM. For example, references to assigning an RF resource to a SIM (or granting a SIM radio access) means that the RF resource has been allocated to establishing or using a communication service with a particular network that is enabled by the information stored in that SIM.

The terms "multi-SIM wireless communication device," "multi-SIM wireless device," "dual-SIM wireless communication device," "dual-SIM dual standby device," and "DSDS device" are used interchangeably herein to describe a wireless device that is configured with more than one SIM and is capable of consecutively handling communications with networks of all subscriptions.

The terms "wireless network," "cellular network," "system," "public land mobile network," and "PLMN" are used interchangeably herein to describe a wireless network of a carrier associated with a wireless device and/or subscription on a wireless device, and/or its roaming partners.

The terms "acquisition" and "reacquisition" when used herein with respect to a system or network or system refer to performing idle mode functions including acquiring channels associated with a SIM. Acquisition may involve scanning a list of previously-acquired PLMNs and their carrier frequencies and/or scanning frequency bands to identify carrier frequencies above a threshold signal strength. Acquiring channels may further include attempting to receive control information, decode synchronization information, and to read system information from broadcasts on the identified strong carrier frequencies.

The term "camping" when used herein with respect to a serving cell or network refers to selecting a suitable cell of a selected PLMN by choosing an acquired service signal broadcasting an identifier of the selected PLMN and tuning to control channels of that cell.

The terms "out-of-service" and "OOS" when used herein with respect to a state, mode, or condition of a wireless device interchangeably refer to an inability or loss of ability to camp on a cell in idle mode. The term "service recovery" when used herein with respect to a wireless device may refer to cell selection processes that are performed on a wireless device in an out-of-service state.

The terms "registration" and "attachment" when used herein with respect to a network or system refer to processes in which a wireless device camped on a serving cell establishes a presence in the network by performing particular messaging exchanges with one or more network entities (e.g., performing a location update, GPRS attach, or IMSI attach procedure in GSM). Reference herein to registration also encompasses successful completion of any necessary preceding steps defined by the applicable protocol standards (e.g., carrier channel acquisition, PLMN selection, cell selection and camping, etc. in GSM).

Messages exchanged in particular registration procedures may vary based on elements including, but not limited to, the network operator, system architecture, communications protocol, radio access technology (RAT) being used, etc. While reference may be made to registration and/or attachment procedures set forth in GSM standards they are provided merely as examples, and the claims apply to other types of cellular telecommunication networks and technologies.

Wireless communication networks are widely deployed to provide various communication services such as voice, packet data, broadcast, messaging, and so on. These wireless networks may be capable of supporting communications for multiple users by sharing the available network resources. Examples of such wireless networks include, but are not limited to, the Global System for Mobile Communications (GSM), Code Division Multiple Access (CDMA) networks, Time Division Multiple Access (TDMA) networks, and Frequency Division Multiple Access (FDMA) networks. Wireless networks may also utilize any of a number of radio technologies, including, without limitation, Wideband-CDMA (W-CDMA), CDMA2000, Global System for Mobile Communications (GSM), Long Term Evolution (LTE), 1x Evolution-Data Only (EVDO), etc.

Following an OOS condition on a multi-SIM wireless device, at least one out-of-service SIM may perform service recovery processes including attempting to acquire and camp on a cell of a selected network using the information stored in the SIM. In a DSDS wireless device in which two or more SIMs share a common RF resource, the SIMs and their associated modem stacks take turns using the shared RF resource to perform system acquisition and camping processes. Typically, if both SIMs are out-of-service, the order in which the DSDS wireless device enables each SIM and its associated modem stack to use the shared RF resource for service recovery may be arbitrary, such as "first-come first-serve." Alternatively, in some multi-SIM devices, use of the shared RF resource for service recovery processes may be granted to SIMs based on a user-selected priority. However, the time to perform system acquisition and camping on a serving cell for service recovery may not reflect the actual communication priorities/requirements between the SIMs on the wireless device. As a result, the distribution of access to the RF resource between out-of-service SIMs may be inefficient for overall service recovery.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices.

Wireless service carriers/service providers may establish public land mobile networks (PLMNs) to provide communication services to the public. Each PLMN may support cells that use one or many different multiple-access wireless communications protocols. Examples of such multiple-access wireless communication protocols may include, but are not limited to, code division multiple access (CDMA), wideband CDMA (WCDMA), Advanced Mobile Phone Service (AMPS), Global System for Mobile communications (GSM), General Packet Radio Services (GARS) or High Data Rate (HDR) technology (e.g., 1×EV technology), 1×EVDO, LTE, etc. For ease of description, the embodiments are described below for GSM-type networks, but the embodiments may equally be applied to networks using any other radio technologies or protocol.

An example GSM network may operate on any of a number of GSM bands (e.g., GSM 900, GSM 850, etc.), each of which cover multiple radio frequency (RF) channels identified in 3GPP TS 05.05, entitled "Digital cellular telecommunications system (Phase 2+); Radio transmission and reception (Release 1999)." Further, each GSM network typically operates on a specific set of RF channels in a specific GSM band. In describing the various embodiments, the terms "channel," and "frequency" may be used interchangeably and may refer to channels in GSM bands, and/or channels in other network bands.

A multi-SIM wireless device in which a baseband-modem processor implements protocols associated with two or more SIMs to share access to a single RF resource may be configured to operate in "standby mode." For example, in dual-standby mode on a DSDS device, the communication services enabled by each SIM may both enter idle mode, but while a communication service enabled by one SIM is transmitting or receiving data, the communication service enabled by the other SIM may be unavailable for use. Other multi-SIM wireless communication devices may be configured to operate more than two SIMs in standby mode, thereby sharing an RF resource among at least three SIMs (e.g., a tri-SIM tri-standby (TSTS) device). The SIMs in a multi-SIM wireless communication device may be associated with the same or different networks. Each SIM may generally be provisioned by a service provider with a list of preferred PLMNs from which the wireless device may receive service (i.e., a home PLMN and roaming partner PLMNs).

Although multi-SIM wireless communication devices offer a variety of options to the end user, they also necessitate efficient execution of complex tasks. In particular, DSDS wireless devices generally have separate modem stacks, each associated with a SIM, that share a single radio, such that if one modem stack is involved in an active communication the other modem stack is denied radio access.

Upon recovering from a radio-off or OOS condition, a conventional wireless device may identify available cells in its vicinity by scanning the channels in a list of previously-acquired carrier frequencies, or by scanning and measuring signal strength on the channels of each enabled frequency band. The wireless device may identify those channels that are above a threshold signal strength as being potential carrier frequencies. Upon detecting that a channel is a carrier frequency, the wireless device typically tunes to that frequency and reads various system and/or control information. For example, in a GSM network the wireless device may decode the Synchronization Channel (SCH) to obtain a base station identity code (BSIC), and may read the broadcast control channel (BCCH) to obtain system information (e.g., a PLMN identifier). The processes involved in acquiring carrier frequencies, as well as the messages and signals that are received and decoded by the wireless device, may vary based on the particular radio access technology and/or network.

A conventional wireless device may also select a desired PLMN based on a preferred PLMN list (i.e., automatic mode) stored in a SIM or by being presented with a list containing all networks found from the PLMN identifiers obtained on carrier frequencies, and may select one from the list stored in the SIM (i.e., manual mode). A conventional wireless device may attempt to find a suitable cell for camping on by passing through the list in descending order of received signal strength, and selecting a carrier frequency with sufficient signal strength that satisfies a set of requirements. The wireless device may camp on the cell by tuning to its control channels.

Once camped on a cell of its selected network, a conventional wireless device may attempt to register its presence in the selected network, such as by a location registration, GPRS attach, or IMSI attach procedure.

While a multi-SIM wireless communication device may be configured to share resources among different SIMs, these conventional processes may be performed sequentially by each SIM. Thus, while the modem stack associated with one SIM is controlling the shared RF resource, a process, service or request by the modem stack associated with another SIM must wait.

Various embodiments may be implemented within a number of communication systems, such as the example communication system 100 illustrated in FIG. 1. The communication system 100 may include one or more wireless devices 102, a telephone network 104, and network servers 106 coupled to the telephone network 104 and to the Internet 108. In some embodiments, the network server 106 may be implemented as a server within the network infrastructure of the telephone network 104.

A typical telephone network 104 includes a plurality of cell base stations 110 coupled to a network operations center 112, which operates to connect voice and data calls between wireless devices 102 (e.g., tablets, laptops, cellular phones, etc.) and other network destinations, such as via telephone land lines (e.g., a POTS network, not shown) and the Internet 108. The telephone network 104 may also include one or more servers 116 coupled to or within the network operations center 112 that provide a connection to the Internet 108 and/or to the network servers 106. Communications between the wireless devices 102 and the telephone network 104 may be accomplished via two-way wireless communication links 114, such as GSM, UMTS, EDGE, 4G, 3G, CDMA, TDMA, LTE, and/or other communication technologies.

For clarity, while the techniques and embodiments described herein relate to a wireless device configured with at least one GSM subscription, they may be extended to subscriptions on other radio access networks (e.g., CDMA2000, UMTS, WCDMA, LTE, etc.).

Figure 2A:
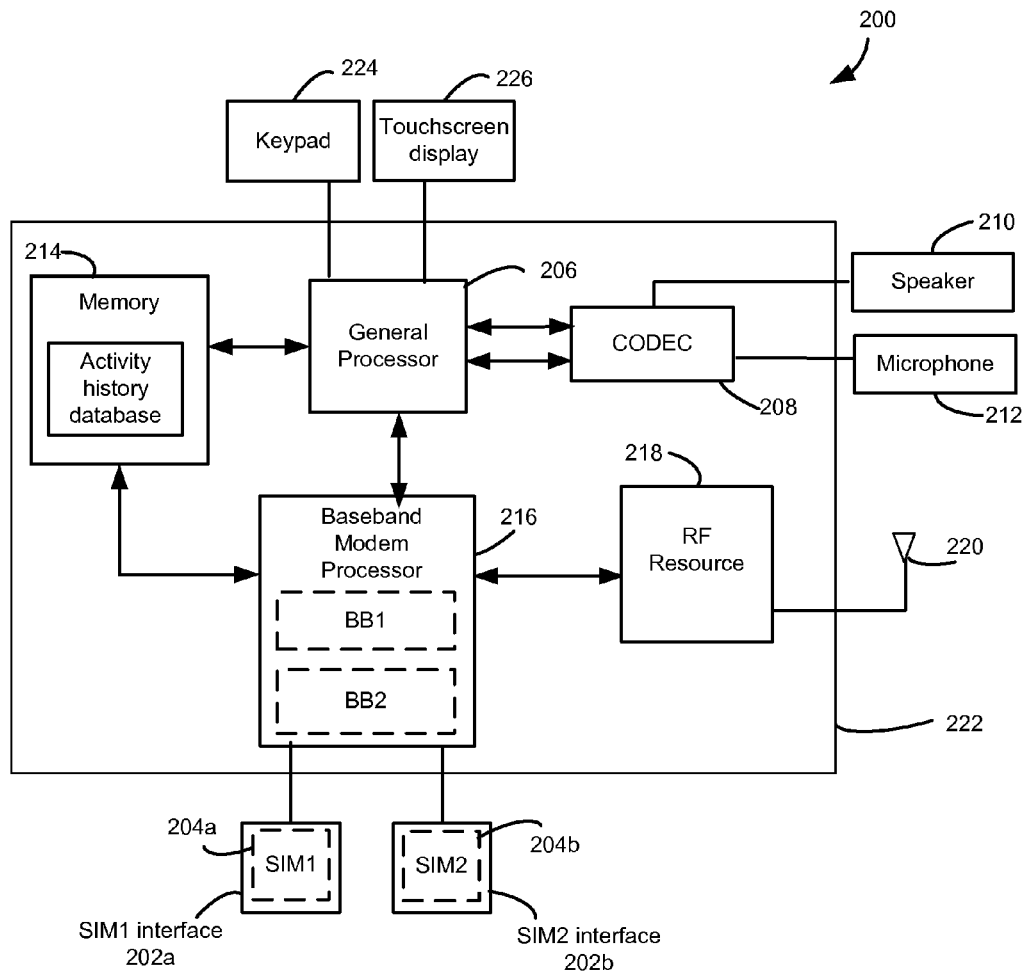
FIG. 2A is a component block diagram illustrating a wireless communication device according to various embodiments.

FIG. 2A is a functional block diagram of a multi-SIM wireless device 200 that is suitable for implementing the various embodiments. According to various embodiments, the wireless device 200 may be similar to one or more of the wireless devices 102 (refer to FIG. 1). With reference to FIGS. 1 and 2, the wireless device 200 may include a first SIM interface 202a, which may receive a first identity module SIM1 204a that is associated with a first subscription. The wireless device 200 may also include a second SIM interface 202b, which may receive a second identity module SIM2 204b that is associated with a second subscription.

A SIM in the various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. In the various embodiments, a SIM may be configured to enable access to networks using any radio access technology, including, but not limited to, LTE networks, 1×EVDO networks, etc.

Each SIM card may have a CPU, ROM, RAM, EEPROM and I/O circuits. A SIM used in the various embodiments may contain user account information, an IMSI a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (IC-CID) SIM serial number may be printed on the SIM card for identification.

The wireless device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store an activity history database for storing information about activity on the modem stacks associated with each SIM, which may be generated from dynamic monitoring of the SIMs (e.g., with reference to FIGS. 5A and 5B).

The general processor 206 and memory 214 may each be coupled to at least one baseband modem processor 216. Each SIM in the wireless device 200 (e.g., SIM1 202a and SIM2 202b) may be associated with a baseband-RF resource chain. A baseband-RF resource chain may include baseband modem processor 216, which may perform baseband/modem functions for communications on at least one SIM, and include one or more amplifiers and radios, referred to generally herein as RF resource 218, which is coupled to an antenna 220. The RF resource 218 may perform transmit/receive functions for at least one SIM of the wireless device 200. In some embodiments, the RF resource 218 may include separate transmit and receive circuitry, or may include a transceiver that combines transmitter and receiver functions. The RF resource 218 may be coupled to the wireless antenna 220 for sending and receiving RF signals.

A DSDS wireless device 200 may have a common baseband-RF resource chain for all SIMs in the wireless device 200 (i.e., a single baseband modem processor 216, a single RF resource 218, and a single antenna 220). In other embodiments, different SIMs may be associated with separate baseband-RF resource chains that include physically or logically separate baseband modem processors (e.g., BB1, BB2), each of which may be coupled to a common RF resource 218 (i.e., a single device that performs transmit/receive functions for all SIMs on the wireless device).

In particular embodiments, the general processor 206, memory 214, baseband modem processor(s) 216, and RF resource 218 may be included in a system-on-chip device 222. The first and second SIMs 204a, 204b and their corresponding interfaces 202a, 202b may be external to the system-on-chip device 222. Further, various input and output devices may be coupled to components of the system-on-chip device 222, such as interfaces or controllers. Example user input components suitable for use in the wireless device 200 may include, but are not limited to, a keypad 224, a touchscreen display 226, and a microphone 212.

In some embodiments, the keypad 224, the touchscreen display 226, the microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in wireless device 200 to enable communication between them, as is known in the art.

Figure 2B:
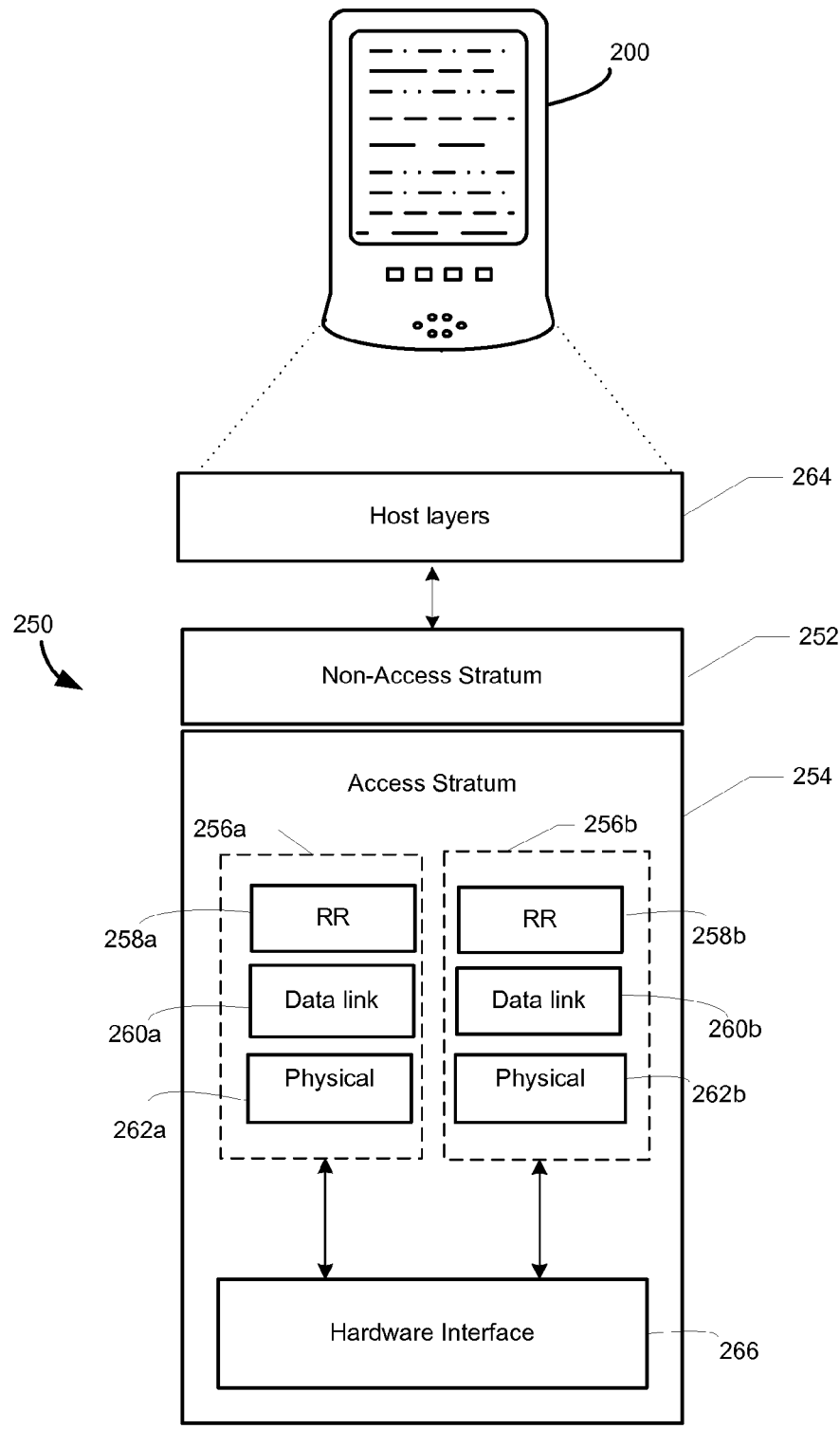
FIG. 2B is a system architecture diagram illustrating example protocol layer stacks implemented by the wireless communication device of FIG. 2A according to various embodiments.

With reference to FIGS. 1-2B, the wireless device 200 may have a layered software architecture 250 to communicate over access networks associated with SIMs. The software architecture 250 may be distributed among one or more processors, such as the baseband modem processor 216. The software architecture 250 may also include a Non Access Stratum (NAS) 252 and an Access Stratum (AS) 254. The NAS 252 may include functions and protocols to support traffic and signaling between SIMs of the wireless device 200 (e.g., SIM1 204a, SIM2 204b) and their respective core networks. The AS 254 may include functions and protocols that support communication between the SIMs (e.g., SIM1 204a, SIM2 204b) and entities of their respective access networks (such as a MSC if in a GSM network).

In the multi-SIM wireless device 200, the AS 254 may include multiple protocol stacks, each of which may be associated with a different SIM. For example, the AS 254 may include protocol stacks 256a, 256b, associated with SIMs 204a, 204b, respectively. Although described below with reference to GSM-type communication layers, protocol stacks 256a, 256b may support any of variety of standards and protocols for wireless communications. Each protocol stack 256a, 256b may respectively include Radio Resource management (RR) layers 258a, 258b. The RR layers 258a, 258b may be part of Layer 3 of a GSM signaling protocol, and may oversee the establishment of a link between the wireless device 200 and associated access networks. In various embodiments, the NAS 252 and RR layers 258a, 258b may perform various functions to search for wireless networks and to establish, maintain, and terminate calls.

In some embodiments, each RR layer 258a, 258b may be one of a number of sub-layers of Layer 3. Other sub-layers may include, for example, connection management (CM) sub-layers (not shown) that route calls, select a service type, prioritize data, perform QoS functions, etc.

Residing below the RR layers 258a, 258b, protocol stacks 256a, 256b may also include data link layers 260a, 260b, which may be part of Layer 2 in a GSM signaling protocol. Data link layers 260a, 260b may provide functions to handle incoming and outgoing data across the network, such as dividing output data into data frames and analyzing incoming data to ensure it has been successfully received. In some embodiments, each data link layer 260a, 260b may contain various sub-layers (e.g., media access control (MAC) and logical link control (LLC) layers (not shown)). Residing below the data link layers 260a, 260b, protocol stacks 256a, 256b may also include physical layers 262a, 262b, which may establish connections over the air interface and manage network resources for the wireless device 200.

While the protocol stacks 256a, 256b provide functions to transmit data through physical media, the software architecture 250 may further include at least one host layer 264 to provide data transfer services to various applications in the wireless device 200. In some embodiments, application-specific functions provided by the at least one host layer 264 may provide an interface between the protocol stacks 256a, 256b and the general processor 206. In other embodiments, the protocol stacks 256a, 256b may each include one or more higher logical layers (e.g., transport, session, presentation, application, etc.) that provide host layer functions. In some embodiments, the software architecture 250 may further include in the AS 254 a hardware interface 266 between physical layers 262a, 262b and the communication hardware (e.g., one or more RF transceivers).

The baseband-modem processor of the multi-SIM device may be configured to execute software including at least two protocol stacks associated with at least two SIMs, respectively. The SIMs and associated protocol stacks may be configured to support a variety of communication services that fulfill different user requirements. Further, a particular SIM may be provisioned with information to execute different signaling procedures for accessing a domain of the core network associated with these services and for handling data thereof.

A suitably provisioned multi-SIM wireless communication device may receive wireless services from more than one wireless network. The wireless communication device may experience an OOS condition for one or more SIM, such as the wireless device being beyond communication ranges of cell sites in the networks supported by the one or more SIM. As a result, the modem stacks associated with the one or more SIM may be in an OOS state. From this state, once the OOS condition ends, the modem stacks of each out-of-service SIM may attempt to connect with a wireless network that is able to provide service by using the RF resource to search for service signals (e.g., acquisition), select a particular network and cell, and attempt to camp on the cell and/or register in the network. As discussed above, while only one out-of-service SIM can use the RF resource at a time to perform service recovery processes, a lack of appropriate mechanism for selecting when and how to assign use of RF resource may introduce undesirable delays in service recovery on all out-of-service SIMs.

In the various embodiments multi-SIM wireless communication devices may implement a user activity-based prioritization scheme for service recovery on at least one SIM following an OOS condition. Factors that may be used to determine whether and when an out-of-service SIM should use a shared RF resource for service recovery processes may include present activity on any SIMs that remain in service (i.e., camped on a serving cell), past activity on each out-of-service SIM at the time that service was lost, and monitored historical activity on each out-of-service SIM. In particular, such factors may be used to calculate a priority value for each out-of-service SIM, which may in turn be used to calculate a relative percentage of time for access to the RF resource to perform service recovery processes on that out-of-service SIM.

For example, a priority value may be calculated for an out-of-service SIM based on activities such as receiving mobile terminating (MT) calls, placing mobile originating calls (MO), participating in a data communication session, etc. In various embodiments, monitoring of activity on which priority value calculations may be based (i.e., important activities) can span over a preset period time looking back from the present (e.g., activity during the previous hour, day, week, etc.). The modem stacks associated with the SIM of the wireless device may be monitored such that occurrences of various activities for each SIM may be counted and stored in an activity history database. The activity history database may include one or more data structures corresponding to each SIM and/or activity on each SIM. In particular, each SIM may correspond to a separately maintained data structure within the activity history database, or the database may maintain a joint data structure corresponding to multiple SIMs.

In various embodiments, the calculation of a priority value may incorporate a weight given to various past activities, reflecting their relative importance as factors in deciding OOS recovery. Specifically, the weight assigned to each activity may be dynamically updated through over-the-air exchanges with a network server or based on evolving user activity patterns, while in other embodiments the weights may be pre-determined and configured on each SIM. In still other embodiments, the weights given to each activity may be pre-set to automatically change based on the time of day. In some embodiments, the automatically changing weights based on the time of day may be dynamically configured using evolving user activity patterns. In some embodiments, a weight given to a particular past activity may be the same, regardless of when such activity occurred, while in other embodiments different weights may be assigned to past activities depending on recency (e.g., higher weights may be assigned to more recent activity). In various embodiments, weights assigned to past activities may be the same for multiple SIMs, while in some embodiments the activity history database may store different weights corresponding to each SIM.

In various embodiments, calculating a priority value for an out-of-service SIM may be performed by accessing the activity history database, which may have stored information about the weights assigned to various activities, as well as the occurrence of activities over a predetermined number of intervals back from the current time. Such information may be used to compute weighted counts of the number of past activity occurrences, which may be input into a service recovery priority equation or scheme.

While described herein with respect to a DSDS wireless device, in some embodiments the user activity-based prioritization scheme maybe applied to service recovery on a multi-SIM multi-active device. For example, in a DSDA device in which two SIMs are associated with independent RF resources, communication activity on the transmit chain for one SIM may interfere (i.e., cause desense to) communication activity on the receive chain for the other SIM. Such communication activity on one or both SIMs may include service recovery processes. Therefore, if at least one SIM of the DSDA device is out-of-service, when both SIMs are simultaneously performing activities, the user activity-based prioritization scheme in the various embodiments may be used to calculate a priority value for each SIM. In various embodiments, communication activity for the SIM having the lower calculated priority may be blanked (i.e., data transmission or reception prevented) on the corresponding RF resource.

Figure 3:
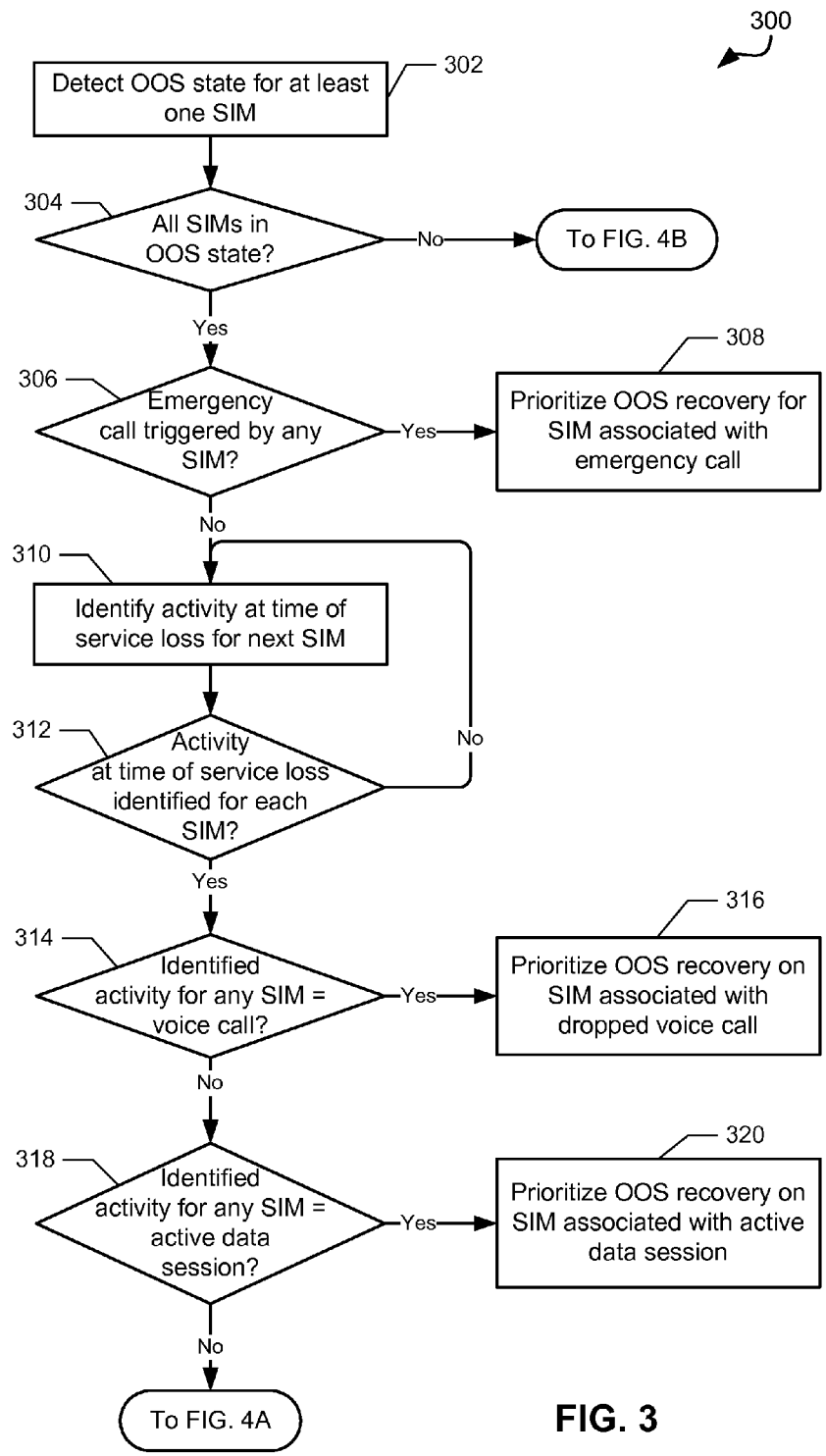
FIG. 3 is a process flow diagram illustrating a method for prioritizing service recovery on one or more out-of-service SIMs of a multi-SIM wireless communication device according to various embodiments.

FIG. 3 illustrates a method 300 of improving OOS recovery processes (i.e., system acquisition and camping on a cell) on a DSDS wireless device configured with at least two SIMs that share access to an RF resource. With reference to FIGS. 1-3, the operations of the method 300 may be implemented by one or more processors of the wireless device 200, such as the general processor 206 and/or the baseband modem processor 216, or a separate controller (not shown) that may be coupled to memory and to the baseband modem processor(s) 216.

In block 302, the wireless device processor may detect that a modem stack associated with at least one SIM of the DSDS wireless device is in an OOS state. The loss of service may be due to any of a number of OOS conditions, including, but not limited to poor network signal strength, loss of a radio resource control (RRC) connection during a call on another SIM, etc. The layered software architecture (e.g., 250 in FIG. 2B) of the wireless device (e.g., 102 in FIG. 1, 200 in FIG. 2A) may be distributed among one or more baseband modem processor(s) 216, which may be part of and/or connected to the RF resource 218. In various embodiments, the protocol stacks (e.g., 256a, 256b of FIG. 2B) may each be associated with a different SIM, and implemented to allow modem operation using information provisioned on multiple SIMs. Therefore, a protocol stack that may be executed by a baseband modem processor is interchangeably referred to herein as a modem stack. In determination block 304, the wireless device processor may determine whether the modem stacks associated with all SIMs of the wireless device are in the OOS state.

In response to determining that the modem stacks associated with all SIMs of the wireless device are in the OOS state (i.e., determination block 304="Yes"), the wireless device processor may determine whether the modem stack associated with any SIM of the wireless device has triggered an emergency call in determination block 306. For example, the wireless device processor may detect, through an interface associated with an out-of-service SIM, a user input corresponding to an emergency dial number (e.g., "9-1-1" in the United States). Regulatory agencies in many areas require wireless service providers to connect all emergency calls dialed from locations in which they provide the closest cell site, regardless of whether the calling device is configured to connect to that network under normal circumstances. Therefore, the modem stack associated with one of the SIMs may trigger an emergency call despite being in the OOS state on the network associated with that SIM, with such call being sent to a public safety answering point (PSAP) on another network. In response to determining that the modem stack associated with a SIM has triggered an emergency call (i.e., determination block 306="Yes"), the wireless device processor may prioritize the OOS recovery process for the SIM associated with the modem stack triggering the emergency call in block 308. In some embodiments, the wireless device processor may similarly prioritize the OOS recovery for a SIM associated with a modem stack that triggers an emergency call at any later point during the method 300 (not shown).

In response to determining that no modem stack associated with a SIM has triggered an emergency call (i.e., determination block 306="No"), the wireless device processor may identify an activity occurring at the time of service loss for a next SIM in block 310. That is, the wireless device processor may identify the action or mode engaged in by the modem stack associated with each SIM at the time service was lost. For example, the modem stack associated with a SIM may have been participating in an active data session, a discontinuous reception (DRX) cycle in idle mode, a call setup process, etc. Such activity may be identified by the wireless device processor in any of a number of ways, depending on configurations and/or radio access technology of serving cell prior to the loss of service. For example, in some embodiments the wireless device may be configured to store service logs documenting ongoing activities upon detecting a loss of service, which may be accessed by the wireless device processor. In other embodiments, the wireless device processor may be configured to separately query the modem stack associated with each SIM in order to obtain information about ongoing activity at the time service was lost.

In determination block 312, the wireless device processor may determine whether an activity at the time of service loss has been identified for each SIM of the wireless device. In response to determining that an activity has not been identified for one or more remaining SIM (i.e., determination block 312="No"), the wireless device processor may identify an activity at the time of service loss of the next SIM in block 310.

In response to determining that an activity from the time of service loss has been identified for each has been identified for each SIM (i.e., determination block 312="Yes"), the wireless device processor may determine whether the identified activity for any SIM is a voice call in determination block 314. That is, the wireless device processor may determine whether a voice call was dropped by the modem stack associated with any SIM upon loss of service. In response to determining that the identified activity for one of the SIMs is a voice call (i.e., determination block 314="Yes"), the wireless device processor may prioritize the OOS recovery process for the SIM associated with the dropped voice call in block 316. Such prioritized OOS recovery may involve allowing continuous access to the RF resource by the associated modem stack until the SIM on which the voice call was dropped has recovered service (e.g., completed system acquisition and camped on a cell of the system), or until an expiration timer indicates that service recovery on that SIM has been unsuccessful after a predetermined number of attempts.

In response to determining that identified activity is not a voice call for any of the SIMs (i.e., determination block 314="No"), the wireless device processor may determine whether the identified activity for any SIM is an active data session in determination block 318. That is, the wireless device processor may determine whether an active data communication session was dropped on any SIM upon the loss of service. In response to determining that the identified activity for one of the SIMs is an active data session (i.e., determination block 318="Yes"), the wireless device processor may prioritize the OOS recovery process for the SIM associated with the dropped active data session in block 320. Such prioritized OOS recovery may involve allowing continuous access to the RF resource by the associated modem stack until the SIM on which the active data session was dropped has recovered service (e.g., completed system acquisition and camped on a cell of the system), or until an expiration timer indicates that service recovery on that SIM has been unsuccessful after a predetermined number of attempts.

In response to determining that the identified activity is not an active data session for any of the SIMs (i.e., determination block 318="No"), the wireless device processor may perform operations in method 400 (e.g., as described with reference to FIG. 4A). In response to determining that the modem stacks associated with less than all of the SIMs of the wireless device are in the OOS state (i.e., determination block 304="No"), the wireless device processor may perform operations in method 450 (e.g., as described with reference to FIG. 4B).

Figure 4A:
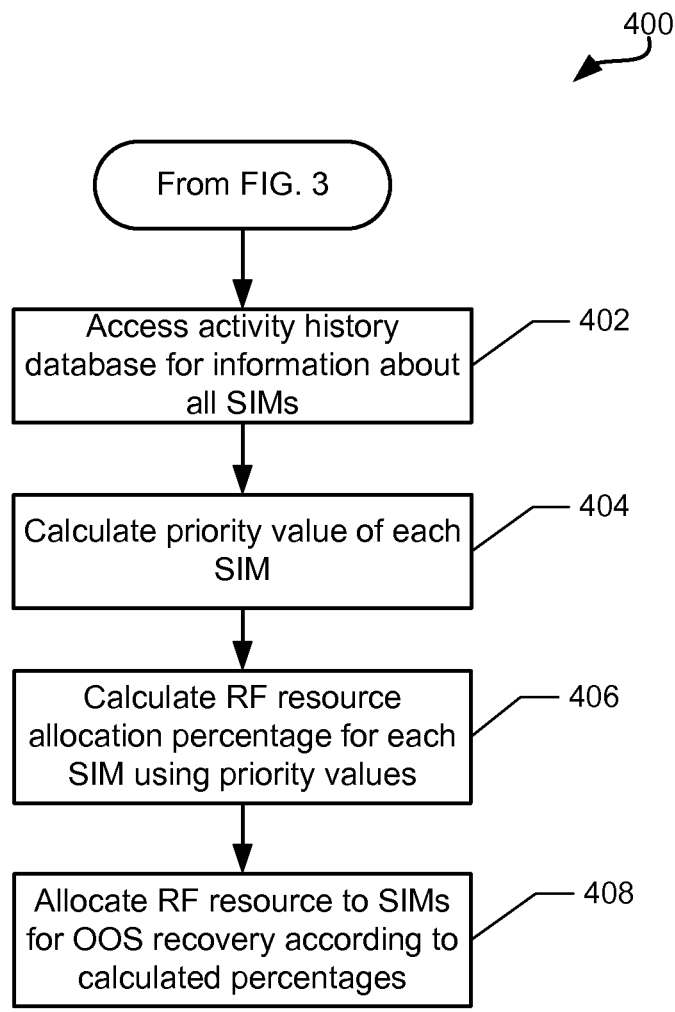
FIG. 4A is a process flow diagram illustrating a method for controlling service recovery on all of the SIMs of a multi-SIM wireless communication device according to various embodiments.

FIG. 4A illustrates a method 400 of applying a prioritization algorithm when all SIMs are in the OOS state and none were engaged in a voice call or active data session at the time service was lost. With reference to FIGS. 1-4A, in block 402, the wireless device processor (e.g., the general processor 206, the baseband modem processor 216, a separate controller, and/or the like) may access an activity history database to access parameter values and/or other information about the wireless device when the identified activity is not an active data session for any of the SIMs (i.e., determination block 318="No"). As described, the activity history database may maintain records of activities performed on the modem stack associated with each SIM. Such activities may be monitored using any of a variety of time intervals (e.g., one hour, one day, fifteen days, etc.), which may be configured, for example, by the network supported by a SIM, the user, the manufacturer, etc. Further, the activity records may be maintained for any number of time intervals spanning back from the current time (e.g., seven intervals of one-day each to evaluate activity for the past week). Example data structures and parameters used in the activity history database are discussed (e.g., with reference to FIG. 5).

In block 404, the wireless device processor may calculate a priority value for service recovery for each SIM of the wireless device. An example equation for calculating such value is discussed (e.g., with reference to FIG. 6). In block 406, using the calculated priority values, the wireless device processor may calculate RF resource allocation percentages for each SIM. The RF resource allocation percentage for a particular out-of-service SIM provides the percentage of time that SIM may be allowed to utilize the RF resource for service recovery. For example, if the wireless device is configured with two SIMs ("SIM1" and "SIM2"), an RF resource allocation percentage for SIM1 may be calculated according to Equation 1:

$$\frac{[\text{priority value }(SIM1)]}{[\text{priority value }(SIM1)] + [\text{priority value }(SIM2)]} * 100. \quad \text{Eq. 1}$$

That is, the RF resource allocation percentage for SIM1 may be the percent that it makes up in the total the priority values for all SIMs on the wireless device. The references to SIM1/a first SIM and SIM2/a second SIM are arbitrary and used merely for the purposes of describing the embodiments, and the wireless device processor may assign any indicator, name or other designation to differentiate between SIMs. In block 408, the wireless device processor may allocate the RF resource to the SIMs according to the calculated percentages for performing service recovery processes.

Figure 4B:
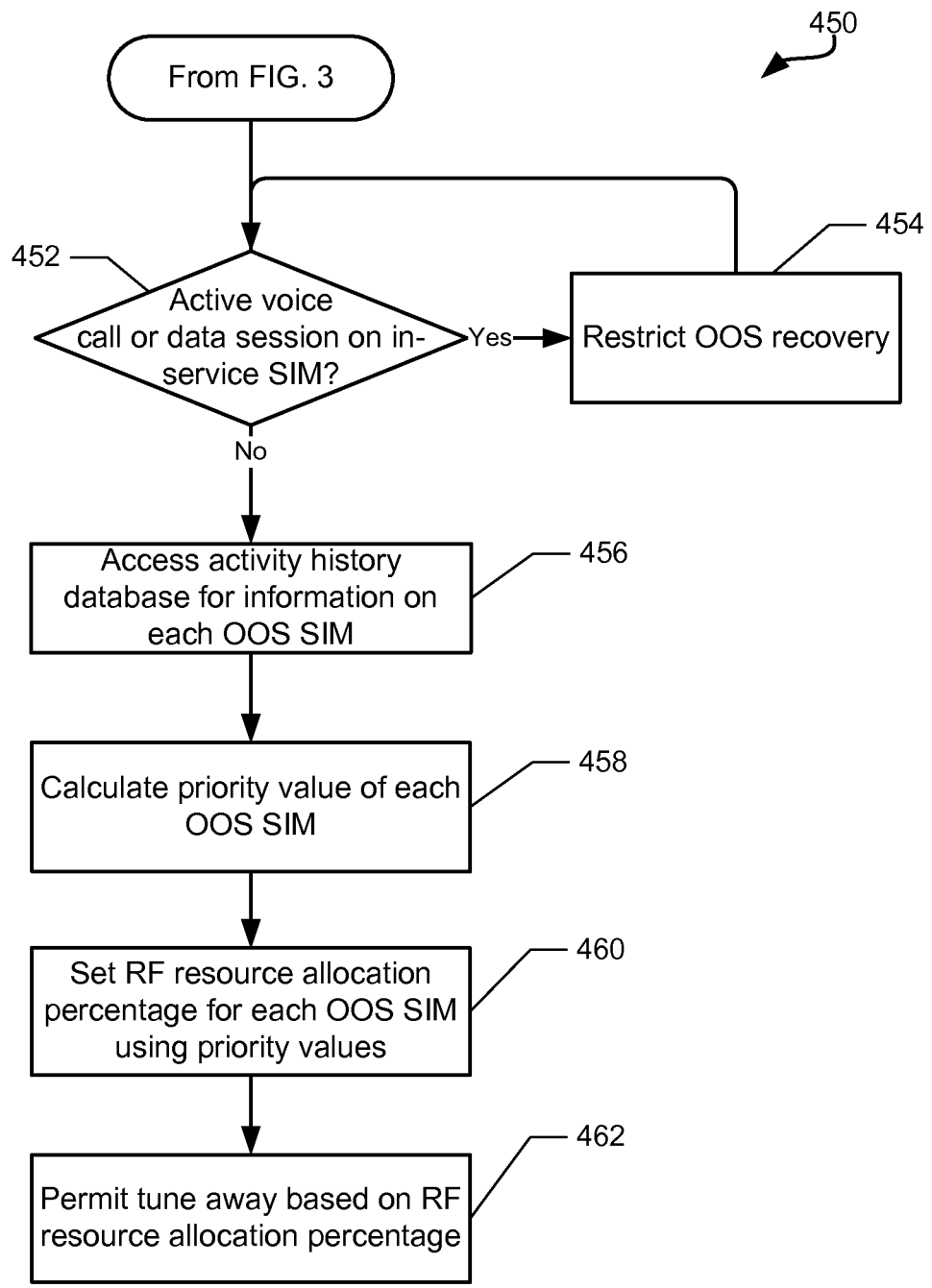
FIG. 4B is a process flow diagram illustrating a method for controlling service recovery on less than all of the SIMs of a multi-SIM wireless communication device according to various embodiments.

FIG. 4B illustrates a method 450 of applying a prioritization algorithm when at least one SIM on the wireless device remains in service. With reference to FIGS. 1-4B, in determination block 452, the wireless device processor (e.g., the general processor 206, the baseband modem processor 216, a separate controller, and/or the like) may determine whether a voice call or active data session is in progress by a modem stack associated with an in-service SIM on the wireless device. In response to determining that a voice call or active data session is in progress by a modem stack associated with an in-service SIM (i.e., determination block 452="Yes"), the wireless device processor may restrict any service recovery processes on an out-of-service SIM in block 454, such as by prohibiting tune-away from the voice call or active data session. Until the voice call or active data session is over (i.e., so long as determination block 452="Yes"), the wireless device processor may continue to refrain from performing any service recovery processes for any out-of-service SIM in block 454.

In response to determining that there is no voice call or active data session in progress by a modem stack associated with an in-service SIM (i.e., determination block 452="No"), in block 456 the wireless device processor may access an activity history database to access or retrieve information for each out-of-service SIM. In block 458, the wireless device processor may calculate a priority value for each out-of-service SIM using the accessed information (e.g., as discussed in with respect to FIG. 6). In block 460, using the at least one calculated priority value, the wireless device processor may calculate an RF resource allocation percentage for each out-of-service SIM. With reference to block 406 (FIG. 4A), calculating the RF resource allocation percentage for each out-of-service SIM may be performed using a similar formula to Equation 1. In particular, since no priority value is calculated for the at least one in-service SIM, a substitute value for each in-service SIM may be used for the purpose of the RF resource allocation percentage calculations in block 460. For example, if the wireless device is configured with two out-of-service SIMs ("SIM1" and "SIM2"), and one in-service SIM ("SIM3") that is not engaged in a voice call or active data session, an RF resource allocation percentage for SIM1 may be calculated according to Equation 2:

$$\frac{[\text{Priority value }(SIM1)]}{[\text{priority value }(SIM1)] + [\text{priority value }(SIM2)] + [\text{substitute value }(SIM3)]} * 100. \quad \text{Eq. 2}$$

The substitute value for SIM3 may reflect the criticality of current activities, a mode, or a connection state of the in-service SIM. In some embodiments, the substitute value may be based on user-configured preferences stored in settings in the wireless device, and/or default values that are implemented in case no user preferences are stored.

In block 462, based on the calculated RF resource allocation percentage for each out-of-service SIM, the wireless device processor may permit tune-away of the RF resource from the activity on the at least one in-service SIM in order to perform service recovery processes. Therefore, when the modem stack associated with an in-service SIM is performing activities that have low criticality, the amount of time in which the RF resource may be used to recover service on an out-of-service SIM may be relatively greater than for higher criticality activities on the in-service SIM.

With reference to FIGS. 1-4B, various embodiments may implement a user-activity based prioritization scheme to recover service on at least one out-of-service SIM. Implementing such prioritization may involve accessing an activity history database, which may include one or multiple data structures that store information corresponding to each SIM. FIGS. 5A and 5B illustrate example data structures that may be stored in an activity history database maintained in memory of the multi-SIM wireless device. With reference to FIGS. 1-5B, the data structures in the activity history database may store information corresponding to each SIM, activity, and/or time interval monitored on the multi-SIM wireless device. The information stored in the data structures of the activity history database may be used to calculate a priority value for each SIM (e.g., as described with reference to FIG. 6).

FIG. 5A illustrates an example data structure 500 for storing weights assigned to activities performed on an example multi-SIM wireless device (e.g., 102 in FIG. 1, 200 in FIG. 2A). With reference to FIGS. 1-5A, in the data structure 500, each row provides a weight value assigned to various past activities performed during a past time interval, and that may be used in determining prioritization between out-of-service SIMs. Specifically, row 502 may provide a weight value assigned to MT calls ("WMT"), row 504 may provide a weight value assigned to MO calls ("WMO"), and row 506 may provide a weight value assigned to data calls ("WD").

In various embodiments, parameters that direct how activities performed on each SIM are monitored may also stored in the activity history database. Examples of such parameters may include, but are not limited to, an activity interval ("A") (not shown), which may set forth a duration of time that provides periodicity to the counting of activity occurrences. For example, the activity interval A may have a value of one hour, indicating that the number of occurrences of a particular activity on a SIM will be counted on per-hour basis. Another parameter that may be stored in the activity history database includes a cycle number parameter ("N") (not shown), which provides the number of past activity intervals (i.e., cycles) to be stored and/or used in priority value calculations. For example, the cycle number parameter N may have a value of three, indicating that counted occurrences of activities on SIMs during each of the past three activity intervals (e.g., past three hours if the value of A is one hour) should be stored. Various combinations of N and A values may be implemented, which may result in more or less monitoring and storing of information for each SIM.

Each column in the data structure 500 corresponds to a monitored time period that has a duration of A. In some embodiments, monitored time periods may be identified by their start times or the time and/or number of activity intervals elapsed since their start times. For example, column 508 may correspond to a monitored time period ending at the current time ("T"), and starting one activity interval back from the current time (identified as "T–A"). In various embodiments, column 510 may correspond to a monitored time period that ended at time T–A, and started two activity intervals back from the current time (identified as "T–2A"). Column 512 may correspond to a monitored time period that ended at time T–2A, and started three activity intervals back form the current time (identified as "T–3A"). In various embodiments, the number of columns in the data structure 500 may correspond to the value of N. Further, while the data structure 500 shows three rows, these rows are provided merely as examples, and are not meant to limit the number of rows that may be included in data structure 500. Further, while the data structure 500 does not differentiate between SIMs, in some embodiments the data structure 500 may include an additional dimension by providing different weights for each SIM. The weight values provided as entries in the data structure 500 are shown merely as examples, and, as discussed above, may be provided from a variety of sources. In various embodiments, the weights given for past activities may be the same for both SIMs, while in some embodiments the activity history database may store different weights corresponding to each SIM.

FIG. 5B illustrates example data structures 550a, 550b, which may store information corresponding to examples SIM1 and SIM2, respectively. With reference to FIGS. 1-5B, in various embodiments, the data structures 550a, 550b store counts of occurrences of each activity identified in the data structure 500, during each monitored time period identified in the data structure 500. In the data structures 550a, 550b, each row provides a count of occurrences from monitoring activity on that SIM, while the columns may correspond to columns 508, 510, 512 from data structure 500.

Specifically, entries in rows 552a, 552b may provide counts of the number of MT calls ("CMT") that were received on SIM1 and SIM2, respectively, during monitored time periods of T-2A, T-3A, etc., through T-NA. Entries in rows 554a, 554b may provide counts of MO calls ("CMO") that were placed on SIM1 and SIM2, respectively, during monitored time periods of T-2A, T-3A, etc., through T-NA. Entries in rows 556a, 556b may provide counts of data calls ("CD") in which SIM1 and SIM2 respectively participated during monitored time periods of T-2A, T-3A, etc., through T-NA.

The various values and information included in the entries of the data structures 500, 550a, 550b are provided merely as examples, and are not meant to limit the data types or values that may be stored therein. In the various embodiments, the data structures 500, 550a, 550b may be stored in a location accessible to the wireless device processor, such as volatile or nonvolatile memory of the wireless device.

While FIG. 5B shows information in data structures 550a, 550b corresponding to two SIMs, data structures in the various embodiments may be configured to accommodate any number of SIMs provisioned in a multi-SIM wireless device. Further, the information shown in the data structures 500, 550a, 550b may also be provided in any of a number of different arrangements of data fields and/or tables. For example, in some embodiments data structures 500, 550a, 550b may be part of a single large data structure.

Figure 6:
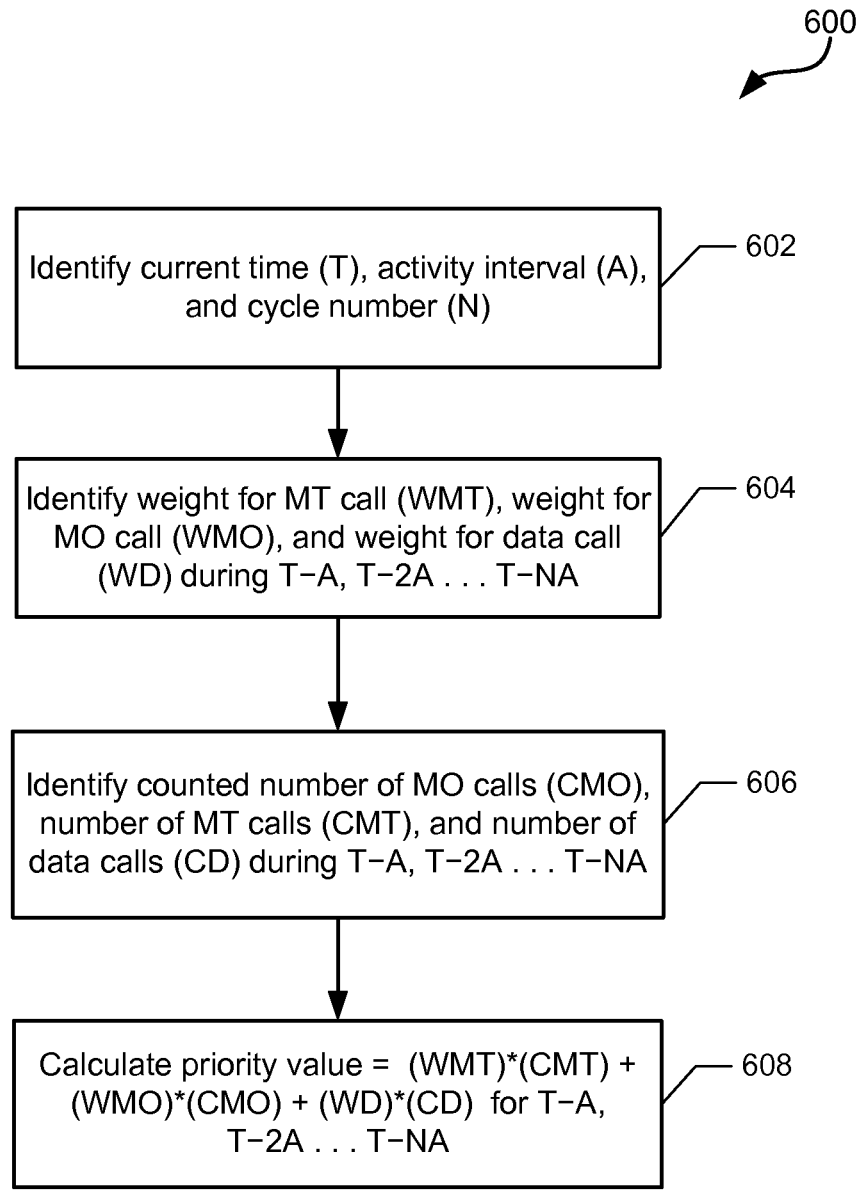
FIG. 6 is a process flow diagram illustrating an embodiment method of calculating a priority value for use in the methods of improving service recovery illustrated in FIGS. 4A and 4B.

FIG. 6 illustrates a method 600 of implementing block 404 of the method 400 (FIG. 4A) and/or of implementing block 416 of the method 450 for an example out-of-service SIM (FIG. 4B). The method 600 may be performed by the wireless device processor (e.g., the general processor 206, the baseband modem processor 216, a separate controller, and/or the like). With reference to FIGS. 1-6, in various embodiments, the example values in entries shown in the data structures 500, 550a, 550b may be used to demonstrate a priority value calculation for an example out-of-service SIM. While the method 600 shows a calculation relating to one example SIM, the steps of the method 600 may be repeated for each out-of-service SIM on the wireless device. Therefore, the example SIM may represent any SIM provisioned on the DSDS wireless device.

In block 602, the wireless device processor may identify values for parameters including the current time T, an activity interval A, and a cycle number N. In various embodiments, the values for A and N may be based on information accessed from the activity history database. With reference to data structures 500, 550a, 550b (e.g., FIGS. 5A and 5B), the example out-of-service SIM may be SIM1, and the example entries shown in the data structures 500, 550a, 550b may be used to demonstrate the priority value calculation for SIM1. Therefore, in this example the value of A may be 1 hour, and the value of N may be 3.

In block 604, the wireless device processor may identify, based on the entries in the data structure 500, example weights assigned to MT calls (WMT) placed, example weights assigned to MO calls (WMO) received, and example weight assigned to data calls (WD) engaged in during each monitored time period T-A, T-2A . . . T-NA.

In block 606, the wireless device processor may identify, based on the entries in data structure 550a, the counted number of MT calls (CMT) that were received on SIM1, the counted number of MO calls (CMO) that were placed on SIM1, and the counted number of data calls (CD) that occurred on SIM1 during monitored time periods of T-2A, T-3A, etc., through T-NA.

In block 608, the wireless device processor may calculate the priority value for the out-of-service SIM as the sum of weighted counts for MT calls, MO calls, and data calls over N activity intervals, according to the following Equation 3:

$$\Sigma_{n=1}^{N}(WMT_{T-nA})*(CMT_{T-nA})(WMO_{T-nA})*(CMO_{T-nA})(WD_{T-nA})*(CD_{T-nA}).$$ Eq. 3

For example, using the values of entries shown in the data structures 500, 550a, the calculation of the priority value for SIM1 may be:

$$\text{Priority value}=8*5+6*3+4*1+6*3+4*2+2*1+7*6+5*4+3*1=155.$$ Eq. 4

With reference to FIGS. 4A and 4B, this priority value for SIM1 may be used, along with the similarly calculated priority values for other out-of-service SIMs on the wireless device, to calculate RF resource allocation percentages for using the RF resource to recovery service.

Figure 7:
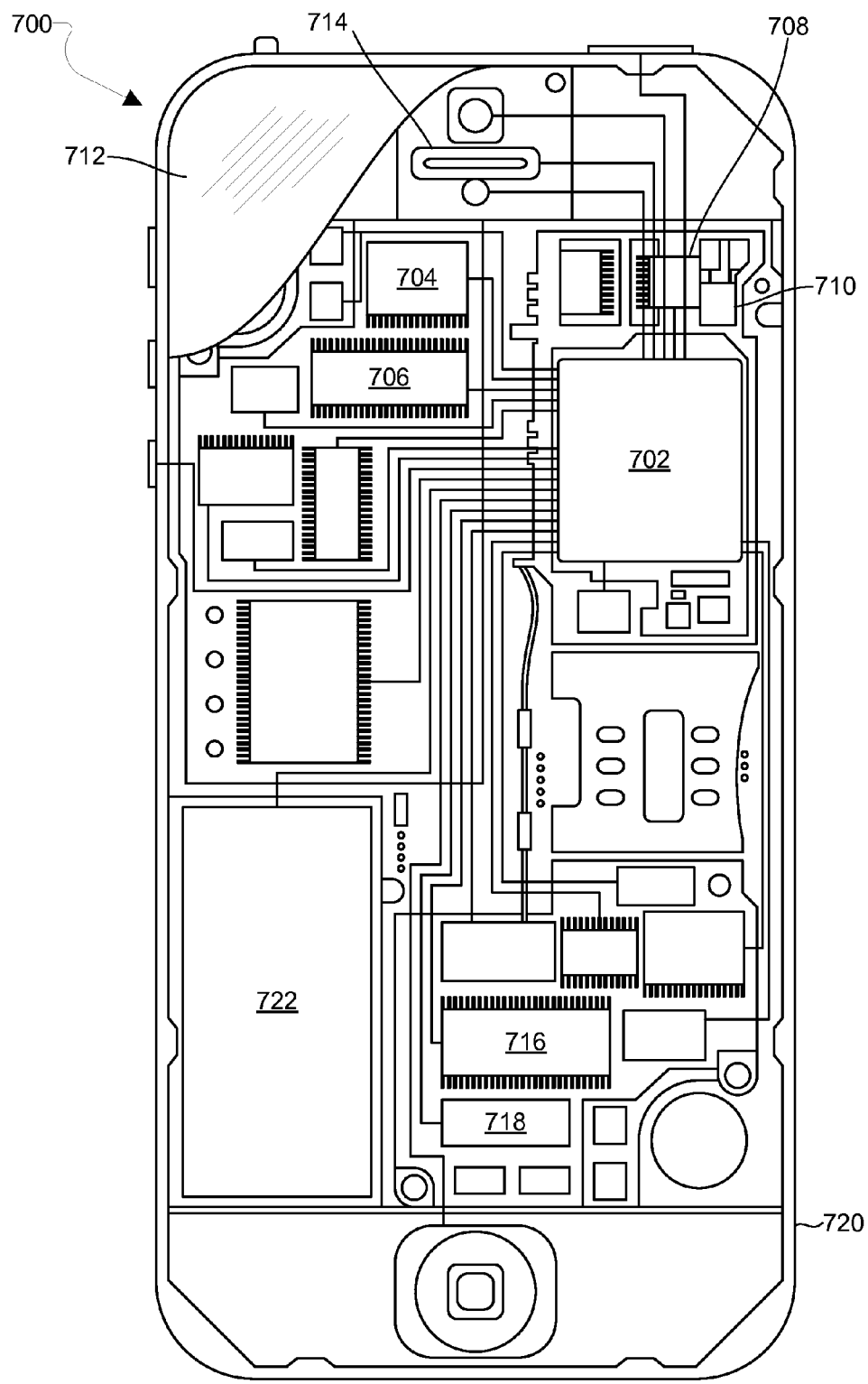
FIG. 7 is a component diagram of an example wireless communication device suitable for use with various embodiments.

The various embodiments (including, but not limited to, embodiments discussed above with reference to FIGS. 3, 4A, 4B, 5A, 5B and 6) may be implemented in any of a variety of wireless devices, an example 700 of which is illustrated in FIG. 7. For example, the wireless device 700 may include a processor 702 coupled to a touchscreen controller 704 and an internal memory 706. The processor 702 may be one or more multicore ICs designated for general or specific processing tasks. The internal memory 706 may be volatile or nonvolatile memory, and may also be secure and/or encrypted memory, or unsecure and/or unencrypted memory, or any combination thereof.

The touchscreen controller 704 and the processor 702 may also be coupled to a touchscreen panel 712, such as a resistive-sensing touchscreen, capacitive-sensing touchscreen, infrared sensing touchscreen, etc. The wireless device 700 may have one or more radio signal transceivers 708 (e.g., Peanut®, Bluetooth®, Zigbee®, Wi-Fi, RF radio) and antennae 710, for sending and receiving, coupled to each other and/or to the processor 702. The transceivers 708 and antennae 710 may be used with the above-mentioned circuitry to implement the various wireless transmission protocol stacks and interfaces. The wireless device 700 may include a cellular network wireless modem chip 716 that enables communication via a cellular network and is coupled to the processor. The wireless device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe.

The peripheral device connection interface 718 may also be coupled to a similarly configured peripheral device connection port (not shown). The wireless device 700 may also include speakers 714 for providing audio outputs. The wireless device 700 may also include a housing 720, constructed of a plastic, metal, or a combination of materials, for containing all or some of the components discussed herein. The wireless device 700 may include a power source 722 coupled to the processor 702, such as a disposable or rechargeable battery. The rechargeable battery may also be coupled to the peripheral device connection port to receive a charging current from a source external to the wireless device 700.

Figure 8:
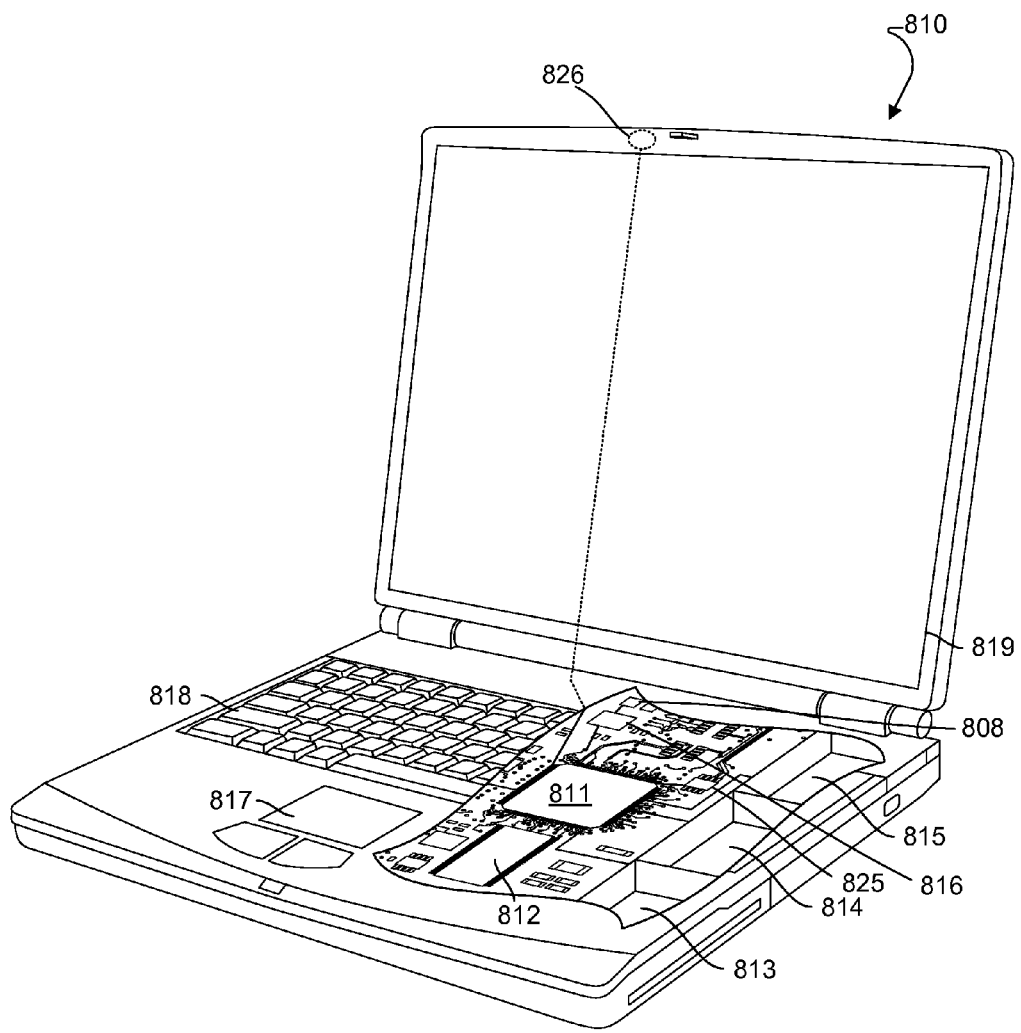
FIG. 8 is a component diagram of another example wireless communication device suitable for use with various embodiments.

The various embodiments described above (including, but not limited to, embodiments discussed above with reference to FIGS. 3, 4A, 4B, 5A, 5B and 6) may also be implemented within a variety of personal computing devices, such as a laptop computer 800 as illustrated in FIG. 8. Many laptop computers include a touchpad touch surface 817 that serves as the computer's pointing device, and thus may receive drag, scroll, and flick gestures similar to those implemented on wireless computing devices equipped with a touch screen display and described above. A laptop computer 800 will typically include a processor 811 coupled to volatile memory 812 and a large capacity nonvolatile memory, such as a disk drive 813 of Flash memory. The computer 800 may also include a floppy disc drive 814 and a compact disc (CD) drive 815 coupled to the processor 811. The computer 800 may also include a number of connector ports coupled to the processor 811 for establishing data connections or receiving external memory devices, such as a USB or FireWire® connector sockets, or other network connection circuits for coupling the processor 811 to a network. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be use in conjunction with the various embodiments.

The processors 702, 811 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 706, 812, 813 before they are accessed and loaded into the processors 702, 811. The processors 702, 811 may include internal memory sufficient to store the application software instructions. In many devices the internal memory may be a volatile or nonvolatile memory, such as flash memory, or a mixture of both. For the purposes of this description, a general reference to memory refers to memory accessible by the processors 702, 811, including internal memory or removable memory plugged into the device and memory within the processor 702, 811, themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but, in the alternative, the processor may be any conventional processor, controller, microcontroller, or state machine. A processor may also be implemented as a combination of computing devices or a multi-core device, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of controlling out-of-service recovery on a multi-SIM wireless communication device having at least a first subscriber identification module (SIM) and a second SIM each respectively associated with a modem stack, comprising:
    detecting that at least one of the modem stack associated with the first SIM and the modem stack associated with the second SIM is in an out-of-service state;
    determining whether the modem stacks associated with the first and second SIMs are both in the out-of-service state; and
    in response to determining that the modem stacks associated with the first and second SIMs are both in the out-of-service state:
       determining whether a voice call or an active data communication session was dropped by the modem stack associated with the first or second SIM upon experiencing a loss of service; and
       prioritizing service recovery on the modem stack corresponding to the dropped voice call or active data communication session in response to determining that a voice call or an active data communication session was dropped by the modem stack associated with the first or second SIM.

2. The method of claim 1, further comprising:
    determining whether an emergency call is triggered on the modem stack associated with the first or second SIM in response to determining that the modem stacks associated with the first and second SIMs are both in the out-of-service state; and
    prioritizing service recovery on the modem stack corresponding to the triggered emergency call in response to determining that an emergency call is triggered on the modem stack associated with either of the first and second SIMs.

3. The method of claim 1, further comprising in response to determining that a voice call or an active data communication session was not dropped by the modem stack associated with the first or second SIM:
    accessing information about past activities on the modem stacks associated with the first SIM and the second SIM; and
    calculating a priority value for each of the first and second SIMs based upon information about past activities on the modem stacks associated with the first SIM and the second SIM.

4. The method of claim 3, wherein calculating a priority value for each of the first and second SIMs based upon information about past activities on the modem stacks associated with the first SIM and the second SIM comprises applying a service recovery priority equation to the information about past activities on the modem stacks associated with the first SIM and the second SIM.

5. The method of claim 3, wherein accessing information about past activities on the modem stacks associated with the first and second SIMs comprises accessing an activity history database stored on the wireless communication device, wherein the information stored in the activity history database comprises:
    a weight assigned to each of a plurality of activities enabled by a connection to a network supported by at least one of the first and the second SIMs; and
    for each SIM, a count totaling a number of occurrences of each activity during at least one monitored time period.

6. The method of claim 5, wherein the plurality of activities comprises a mobile terminating call, a mobile originating call, and a data communication session.

7. The method of claim 5, wherein the information stored in the activity history database further comprises values for:
    an activity interval parameter that provides a duration of the at least one monitored time period; and
    a cycle number parameter that identifies a number of past activity intervals to be used in calculating the priority value for each of the first and second SIMs.

8. The method of claim 7, wherein calculating the priority value for each of the first and second SIMs further comprises for each of the first and second SIMs:
    identifying at least one relevant monitored time period based on current time and the values stored for the activity interval parameter the cycle parameter;
    calculating a weighted count for each activity corresponding to each of the at least one relevant monitored time period, wherein the weighted count is calculated as a product of the weight assigned to each activity and the count totaling the number of occurrences for each activity; and
    computing a sum of the calculated weighted count for each activity corresponding to each of the at least one relevant monitored time period.

9. The method of claim 3, wherein the modem stacks associated with the first and second SIMs share a single radio frequency (RF) resource, and wherein the method further comprises:
    calculating, based on the calculated priority values, an RF resource allocation percentage for each of the first and second SIMs; and
    granting use of the RF resource to the modem stacks associated with the first and second SIMs, wherein relative amounts of use granted to each modem stack correspond to the calculated RF resource allocation percentages.

10. The method of claim 9, wherein calculating the RF resource allocation percentage for one of the first and second SIMs comprises:
    calculating a sum of priority values calculated for the first and second SIMs; and
    dividing the priority value for the one of the first and second SIMs by the calculated sum and multiplying the resulting fraction by 100.

11. The method of claim 1, further comprising:
    identifying the first or second SIM as an in-service SIM in response to determining that the modem stacks associated with the first and second SIMs are not both in the out-of-service state;
    determining whether the modem stack associated with the in-service SIM is participating in a current voice or data communication;
    accessing information about past activities on the modem stack that is the out-of-service state; and
    calculating a priority value for the SIM associated with the modem stack in the out-of-service state.

12. The method of claim 11, further comprising:
restricting service recovery by the modem stack in the out-of-service state in response to determining that the modem stack associated with the in-service SIM is participating in a current voice or data communication.

13. The method of claim 11, wherein accessing information about past activities on the modem stack in the out-of-service state comprises accessing an activity history database stored on the wireless communication device, wherein the information accessed from the activity history database comprises:
  a weight assigned to each of a plurality of activities enabled by a connection to a network supported by the SIM associated with the modem stack in the out-of-service state; and
  a count totaling a number of occurrences of each activity during at least one monitored time period on the SIM associated with the modem stack in the out-of-service state.

14. The method of claim 13, wherein the modem stacks associated with the first and second SIMs share a single radio frequency (RF) resource, and wherein the method further comprises:
  identifying a substitute priority value for the in-service SIM;
  calculating, based on the calculated priority value and the substitute priority value, an RF resource allocation percentage for the SIM associated with the modem stack in the out-of-service state; and
  permitting tune-away of the RF resource from a network supported by the in-service SIM to a network supported by the SIM associated with the modem stack in the out-of-service state, wherein an amount of time for the tune-away corresponds to the calculated RF resource allocation percentage.

15. A wireless communication device, comprising:
  a radio frequency (RF) resource configured to connect to at least one of a first subscriber identity module (SIM) and a second SIM; and
  a processor coupled to the RF resource and configured with processor-executable instructions to:
    detect that at least one of a modem stack associated with the first SIM and a modem stack associated with the second SIM is in an out-of-service state;
    determine whether the modem stacks associated with the first and second SIMs are both in the out-of-service state; and
    in response to determining that the modem stacks associated with the first and second SIMs are both in the out-of-service state:
      determine whether a voice call or an active data communication session was dropped by the modem stack associated with the first or second SIM upon experiencing a loss of service; and
      prioritize service recovery on the modem stack corresponding to the dropped voice call or active data communication session in response to determining that a voice call or an active data communication session was dropped by the modem stack associated with the first or second SIM.

16. The wireless communication device of claim 15, wherein the processor is further configured with processor-executable instructions to:
  determine whether an emergency call is triggered on the modem stack associated with the first or second SIM in response to determining that the modem stacks associated with the first and second SIMs are both in the out-of-service state; and
  prioritize service recovery on the modem stack corresponding to the triggered emergency call in response to determining that an emergency call is triggered on the modem stack associated with either of the first and second SIMs.

17. The wireless communication device of claim 15, wherein the processor is further configured with processor-executable instructions to access information about past activities on the modem stacks associated with the first SIM and the second SIM and calculate a priority value for each of the first and second SIMs based upon information in response to determining that a voice call or an active data communication session was not dropped by the modem stack associated with the first or second SIM.

18. The wireless communication device of claim 17, wherein the processor is further configured with processor-executable instructions to calculate a priority value for each of the first and second SIMs based upon information about past activities on the modem stacks associated with the first SIM and the second SIM by applying a service recovery priority equation to the information about past activities on the modem stacks associated with the first SIM and the second SIM.

19. The wireless communication device of claim 17, wherein the processor is further configured with processor-executable instructions to access information about past activities on the modem stacks associated with the first and second SIMs by accessing an activity history database stored on the wireless communication device, wherein the information stored in the activity history database comprises:
  a weight assigned to each of a plurality of activities enabled by a connection to a network supported by at least one of the first and the second SIMs; and
  for each SIM, a count totaling a number of occurrences of each activity during at least one monitored time period.

20. The wireless communication device of claim 19, wherein the plurality of activities comprises a mobile terminating call, a mobile originating call, and a data communication session.

21. The wireless communication device of claim 19, wherein the information stored in the activity history database further comprises values for:
  an activity interval parameter that provides a duration of the at least one monitored time period; and
  a cycle number parameter that identifies a number of past activity intervals to be used in calculating the priority value for each of the first and second SIMs.

22. The wireless communication device of claim 21, wherein the processor is further configured with processor-executable instructions to calculate the priority value for each of the first and second SIMs by, for each of the first and second SIMs:
  identifying at least one relevant monitored time period based on current time and the values stored for the activity interval parameter the cycle parameter;
  calculating a weighted count for each activity corresponding to each of the at least one relevant monitored time period, wherein the weighted count is calculated as a product of the weight assigned to each activity and the count totaling the number of occurrences for each activity; and
  computing a sum of the calculated weighted count for each activity corresponding to each of the at least one relevant monitored time period.

23. The wireless communication device of claim 17, wherein the RF resource is configured to connect to the first and second SIMs, and wherein the processor is further configured with processor-executable instructions to:
  calculate, based on the calculated priority values, an RF resource allocation percentage for each of the first and second SIMs; and
  grant use of the RF resource to the modem stacks associated with the first and second SIMs, wherein relative amounts of use granted to each modem stack correspond to the calculated RF resource allocation percentages.

24. The wireless communication device of claim 23, wherein the processor is further configured with processor-executable instructions to calculate the RF resource allocation percentage for one of the first and second SIMs by:
  calculating a sum of priority values calculated for the first and second SIMs; and
  dividing the priority value for the one of the first and second SIMs by the calculated sum and multiplying the resulting fraction by 100.

25. The wireless communication device of claim 15, wherein the processor is further configured with processor-executable instructions to:
  identify the first or second SIM as an in-service SIM in response to determining that the modem stacks associated with the first and second SIMs are not both in the out-of-service state;
  determine whether the modem stack associated with the in-service SIM is participating in a current voice or data communication;
  access information about past activities on the modem stack that is the out-of-service state; and
  calculate a priority value for the SIM associated with the modem stack in the out-of-service state.

26. The wireless communication device of claim 25, wherein the processor is further configured with processor-executable instructions to restrict service recovery by the modem stack in the out-of-service state in response to determining that the modem stack associated with the in-service SIM is participating in a current voice or data communication.

27. The wireless communication device of claim 25, wherein the processor is further configured with processor-executable instructions to access information about past activities on the modem stack in the out-of-service state by accessing an activity history database stored on the wireless communication device, wherein the information accessed from the activity history database comprises:
  a weight assigned to each of a plurality of activities enabled by a connection to a network supported by the SIM associated with the modem stack in the out-of-service state; and
  a count totaling a number of occurrences of each activity during at least one monitored time period on the SIM associated with the modem stack in the out-of-service state.

28. The wireless communication device of claim 27, wherein the RF resource is configured to connect to the first and second SIMs, and wherein the processor is further configured with processor-executable instructions to:
  identify a substitute priority value for the in-service SIM;
  calculate, based on the calculated priority value and the substitute priority value, an RF resource allocation percentage for the SIM associated with the modem stack in the out-of-service state; and
  permit tune-away of the RF resource from a network supported by the in-service SIM to a network supported by the SIM associated with the modem stack in the out-of-service state, wherein an amount of time for the tune-away corresponds to the calculated RF resource allocation percentage.

29. A wireless communication device, comprising:
  a radio frequency (RF) resource configured to connect to at least one of a first subscriber identity module (SIM) and a second SIM;
  means for detecting that at least one of a modem stack associated with the first SIM and a modem stack associated with the second SIM is in an out-of-service state;
  means for determining whether the modem stacks associated with the first and second SIMs are both in the out-of-service state; and
  means for determining whether a voice call or an active data communication session was dropped by the modem stack associated with the first or second SIM upon experiencing a loss of service in response to determining that the modem stacks associated with the first and second SIMs are both in the out-of-service state; and
  means for prioritizing service recovery on the modem stack corresponding to the dropped voice call or active data communication session in response to determining that a voice call or an active data communication session was dropped by the modem stack associated with the first or second SIM.

30. A non-transitory processor-readable storage medium having stored thereon processor-executable instructions configured to cause a processor of a wireless communication device having a radio frequency (RF) resource associated with at least one of a first subscriber identity modules (SIM) and a second SIM to perform operations comprising:
  detecting that at least one of a modem stack associated with the first SIM and a modem stack associated with the second SIM is in an out-of-service state;
  determining whether the modem stacks associated with the first and second SIMs are both in the out-of-service state; and
  in response to determining that the modem stacks associated with the first and second SIMs are both in the out-of-service state:
    determining whether a voice call or an active data communication session was dropped by the modem stack associated with the first or second SIM upon experiencing a loss of service; and
    prioritizing service recovery on the modem stack corresponding to the dropped voice call or active data communication session in response to determining that a voice call or an active data communication session was dropped by the modem stack associated with the first or second SIM.

* * * * *